United States Patent [19]

Ruddy

[11] Patent Number: 4,664,021
[45] Date of Patent: May 12, 1987

[54] TREATMENT OF PISTONS

[75] Inventor: Brian L. Ruddy, Wetherby, England

[73] Assignee: AE PLC, Warwickshire, United Kingdom

[21] Appl. No.: 764,573

[22] Filed: Aug. 12, 1985

[30] Foreign Application Priority Data

Aug. 13, 1984 [GB] United Kingdom ............... 8420544
Sep. 7, 1984 [GB] United Kingdom ............... 8422672

[51] Int. Cl.$^4$ ............................................. F16J 1/04
[52] U.S. Cl. ................................. 92/223; 29/156.5 R; 29/458; 92/231; 123/193 P
[58] Field of Search .............. 92/223, 224, 231, 260; 123/193 P; 29/156.5 R, 458, 527.2

[56] References Cited

U.S. PATENT DOCUMENTS

| 1,256,954 | 2/1918 | Travers | 92/223 |
| 1,467,255 | 9/1923 | Thomson | 92/223 X |
| 2,323,074 | 6/1943 | Neugebauer et al. | 92/223 X |
| 2,403,455 | 7/1946 | Phillips | |
| 2,992,869 | 7/1961 | Van Der Horst | 92/223 |
| 3,075,817 | 1/1963 | Mayes | 29/156.5 R |
| 3,203,321 | 8/1965 | Rosen | 92/223 |
| 3,405,610 | 10/1968 | Hill et al. | 92/223 |
| 3,911,891 | 10/1975 | Dowell | 92/223 X |
| 4,334,507 | 6/1982 | Kohnert et al. | 29/156.5 R |

FOREIGN PATENT DOCUMENTS

| 0084385 | 1/1982 | European Pat. Off. | |
| 1045745 | 12/1953 | France | |
| 1460183 | 10/1966 | France | |
| 227662 | 9/1943 | Switzerland | |
| 1078556 | 8/1967 | United Kingdom | |
| 1326480 | 12/1971 | United Kingdom | |

OTHER PUBLICATIONS

Proceedings of the Institute of Mechanical Engineers part 2A, vol. 179, No. 6, 1964/1965, p. 192, left-hand col., last six lines.

Primary Examiner—Edward K. Look
Attorney, Agent, or Firm—Leydig, Voit & Mayer

[57] ABSTRACT

The detonation-resistant material is applied to a piston to reduce the likelihood of damage to the piston caused by pinking or knocking. The detonation-resistant material, which may be nickel or a nickel based material, is applied to the upper part of the ring band and around an annular portion of the crown adjacent the edge of the crown. The ring band is, before treatment, machined to form a recess extending therearound which is filled with the detonation-resistant material by a plating process. Thus, on the ring band, the detonation-resistant material does not extend radially outwardly of the remainder of the ring band. This reduces the possibility of the detonation-resistant material scraping or scuffing on the associated cylinder or liner during movement of the piston in the associated cylinder or liner and also reduces the likelihood of the detonation-resistant material being scraped off.

8 Claims, 5 Drawing Figures

TREATMENT OF PISTONS

BACKGROUND TO THE INVENTION

1. Field of the Invention

The invention relates to the treatment of pistons to improve their resistance to detonation damage.

A conventional piston comprises a crown and a ring band, extending around the crown and meeting the crown at an edge. One or more piston ring grooves are formed in the ring band and carry respective rings; the uppermost of which is a compression ring sealing against an associated cylinder or liner to prevent the downward passage of high pressure gases from the combustion of a fuel/air mixture above the crown. The detonation of fuel can cause damage to the piston, particularly to those portions of the crown and the ring band adjacent the edge between them. This is an increasing problem, since in recent years engine designers have tended to design engines which operate with higher air/fuel ratios. In addition, less and less lead is being used in fuels. Both of these measures produce an increased tendency for an engine to 'pink' or 'knock' which, in turn, leads to an increased likelihood of detonation damage.

2. Review of the Prior Art

It has been proposed to protect those parts of the piston likely to be damaged by detonation by applying to those regions a coating which is more resistant to detonation than the material of the piston. For example, it has been proposed to apply a coating of nickel, by electroplating or by electroless plating of nickel over the whole area of the crown and around the ring band as far down as the top compression ring.

In operation, however, a piston oscillates in the associated cylinder or liner and also tends to pivot about a gudgeon pin, by which the piston is connected to an associated connecting rod. As a result of this, there is a tendency for the upper part of the ring band adjacent the edge between the ring band and the crown to touch the associated cylinder or liner. The presence of a coating, such as nickel, in this region can lead to scoring or scuffing on the associated cylinder or liner, and this is plainly undesirable. Under certain conditions, it is even possible for the coating to be scraped-off the piston and particles of coating in the lubricant are another source of unwanted scoring or scuffing.

SUMMARY OF THE INVENTION

According to a first aspect of the invention, there is provided a method of treating a piston of aluminum or aluminium alloy and of the kind comprising a crown and a ring band extending around the crown and meeting the crown at an edge therebetween, the method comprising cutting away the surface of the ring band at said edge, and then treating said cut-away portion to provide in said cut-away portion, a material which has improved resistance to detonation in comparison with the material of the piston, said detonation-resistant material in the cut-away portion having a thickness at any point not greater than the depth of the recess at that point.

Thus, the detonation-resistant material on the part of the ring band adjacent the edge of the crown is not proud of the surface of the piston but rather is flush or below the surrounding piston surface. This reduces substantially the likelihood of the coating scoring or scuffing the associated cylinder or liner and also reduces the likelihood of the coating being damaged and removed.

According to a second aspect of the invention, there is provided a piston for an internal combustion engine and of aluminium or an aluminium alloy, comprising a crown and a ring band extending around the crown and meeting the crown at an edge, the ring band being provided with a cut-away portion extending around the ring band from said edge, the cut-away portion having thereon a material which has improved resistance to detonation in comparison with the material of the piston, the detonation-resistant material not extending beyond the depth of the cut-away portion.

BRIEF DESCRIPTION OF THE DRAWINGS

The following is a more detailed description of some embodiments of the invention, by way of example, reference being made to the accompanying drawings in which.

DESCRIPTION OF THE PREFERRED EMBODIMENTS

Figure 1:
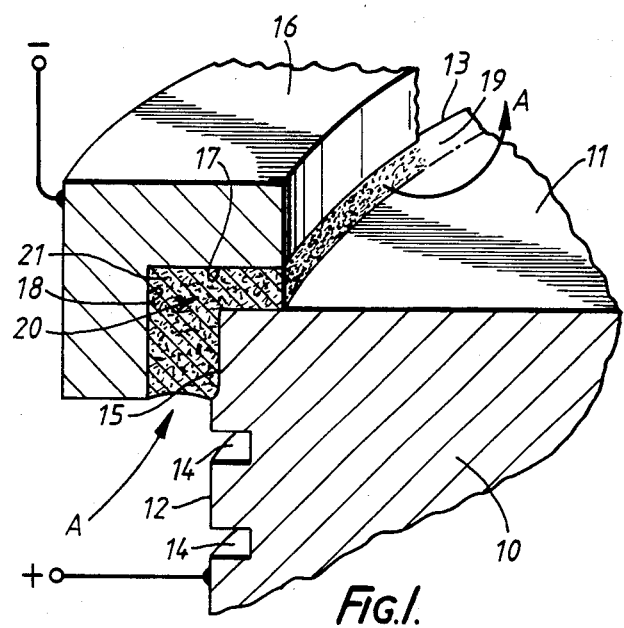
FIG. 1 is a schematic perspective view, partly in cross-section, of a piston having a cut-away portion around the ring band thereof and being plated by use of an annular anode.

Referring first to FIG. 1, the piston 10 is forged or cast, preferably squeeze cast from a suitable aluminium or aluminium alloy, such as that known by the trade name Lo-Ex. The piston has a crown 11, and a ring band 12 extending around the crown and meeting at an annular edge 13. The ring band is formed with one or more piston ring grooves 14; only two are shown in FIG. 1. The uppermost piston ring groove is for accommodating a compression ring (not shown) which acts to prevent combustion gases passing between the piston and the associated cylinder.

The piston is treated in the following way to reduce the incidence of detonation damage. First an annular recess 15 is machined around the ring band, extending downwardly from the edge between the ring band 12 and the crown 11 almost to the uppermost piston ring groove 14. The depth of the recess is approximately 0.025 mm but any other suitable depth may be used. The recess 15 extends almost down to the uppermost piston ring groove.

The recessed piston 10 is next mounted in an apparatus for treating the piston, to apply to the recesses a detonation-resistant coating. The apparatus comprises a mounting for the piston 10 (not shown) which allows the piston 10 to be rotated about its axis during treatment. Also provided is an annular anode 16 which may be of graphite. The anode 16 is arranged coaxially with the axis of the piston 10 and is formed with a step of inverted L-shape providing annular radially extending and axially extending surfaces 17, 18 respectively. The radial surface 17 is spaced axially from the crown 11 of the piston and overlaps an annular portion 19 of the piston extending radially inwardly from the edge 13.

The axially extending surface is radially spaced from and parallel to the recess 15. There is thus formed an annular L-shaped gap 20 between the anode 16 on the one hand and the recess 15 and the edge portion 19 of the crown on the other hand. A porous pad 21 is placed in this gap 20 and is of any suitable porous material such as the material sold under the trade name SCOTCH-BRITE or an absorbent cotton or a woven or non-woven material. The porous pad 21 contains a suitable electrolyte of the material which is to be plated. In addition, a plating solution is pumped through the gap 20 as shown by the arrows A in FIG. 1.

There are a large number of suitable plating materials of which the following are examples. They can be used either alone or in combination. The examples are as follows: nickel, tin/nickel, tin/cobalt, nickel/iron, nickel/cobalt, composite cobalt/chromium carbide, a chronium/iron/nickel alloy, molybdenum, tungsten, tungsten carbide.

Figure 2:
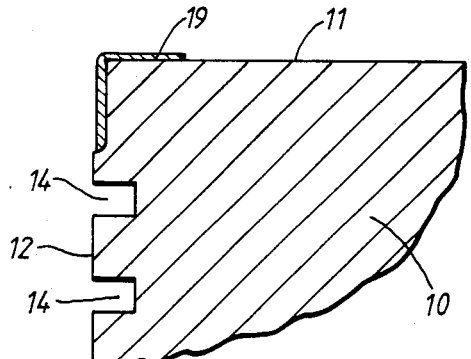
FIG. 2 is a partial cross-sectional view of a piston so treated.

The electrolytic plating process is continued for a time sufficient to plate the recess 15 and the crown portion 19 with a thickness of plating material not greater than the depth of the recess 15. It will be appreciated that a suitable masking material may be used as necessary. Preferably, the thickness of the plating is just less than the depth of the recess at any point. This is shown in FIG. 2.

It will also be appreciated that the coating may be a graded multi-layer coating using any required combination of the materials referred to above. For example, there may be provided successive coatings of nickel and chromium/iron or chomium/iron/nickel alloy or nickel and silicon carbide followed by nickel and titanium carbide. The plating may be electroless plating or a plasma spraying technique.

Figure 3:
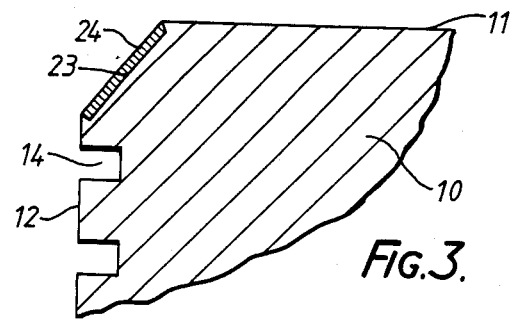
FIG. 3 is a partial cross-sectional view of a second form of piston treated by the method of FIG. 1.

Referring next to FIG. 3, in this embodiment, the piston is prepared in any one of the ways described above with reference to FIG. 1, except that the recess 15 is omitted. Rather, in this embodiment, the ring band 12 and the crown 11 are cut-away around the piston to form a bevelled surface 23 extending around the piston. This is provided with a detonation-resistant coating in any of the ways described above with reference to the drawings, but with the anode 16 and the associated parts shaped appropriately in order to provided a detonation-resistant coating 24 on the surface 23.

Figure 4:
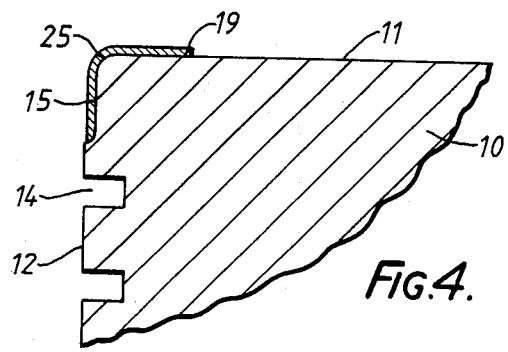
FIG. 4 is a partial cross-sectional view of a third form of piston treated by the method of FIG. 1.

Referring next to FIG. 4, in this embodiment, the recess 15 is shaped generally as described above with reference to FIGS. 1 and 2, parts common to these Figures and to FIG. 4 being given the same reference numerals and not being specifically described. In addition, a radiussed edge 25 is provided between the recess 15 and the crown portion 19 to provide a smooth transition between those surfaces for the plating, which is applied in any one of the ways described above with reference to FIGS. 1 and 2.

Figure 5:
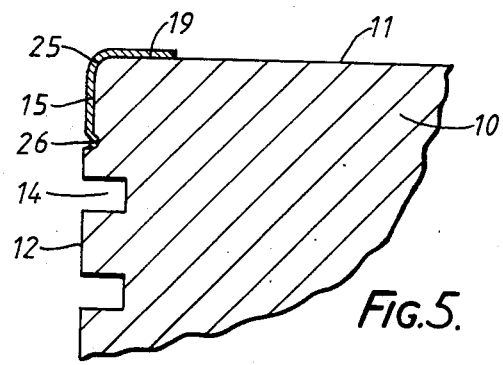
FIG. 5 is a partial cross-sectional view of a fourth form of piston treated by the method of FIG. 1.

Referring next to FIG. 5, this embodiment is generally similar to the embodiment of FIG. 4 and parts common to to two Figures are given the same reference numerals and are not specifically described. In this embodiment, the lower end of the recess 15 is provided with an annular radially inwardly extending relief 26. This prevents the build-up of plating material at this lower edge—the plating being applied in any one of the ways described above with reference to FIGS. 1 and 2.

In use of the pistons described above with reference to the drawings, the detonation-resistant material is unaffected by pivoting and oscillation of the piston in an associated cylinder because there is no projecting part of the coating to engage and damage the associated cylinder or liner. This also reduces the tendency of the detonation resistant material to be removed from the piston and so reduces the likelihood of abrasion or scuffing caused in this way. The presence of the detonation-resistant material in this region reduces the tendency for detonation to occur and, since this is the region where detonation is most likely, the material thus reduces the incidence of detonation.

A test has been performed in which an internal combustion engine is run at particular controlled conditions under which detonation is known to occur. The engine (a 2.0 liter overhead camshaft engine) is run first with untreated pistons and then with pistons treated with nickel as described above with reference to FIG. 1. The pistons are, following the test, examined visually.

The test conditions are as follows:

The 2.0 liter overhead camshaft engine is run-in for 7 hours under standard conditions. Then the engine is set-up to run as follows:

Water temperature: 95° C.
Oil temperature: 105° C.
Inlet air temperature: 35° C.
Ignition timing advance
(relative to standard timing): 14° C. (crank)
Engine speed: 4000 r.p.m.
Maximum time of test: 7 hours The untreated and the treated pistons were run under these conditions and, following completion of the test, or on prior piston failure, the pistons were removed and examined visually.

The results were as follows:

1. Untreated pistons—these failed in less than seven hours due to detonation damage of the piston crowns.

2. Treated pistons—these had an entirely satisfactory appearance after seven hours. The test was continued for a further four hours. The appearance remained satisfactory. The test was continued for a yet further four hours. The appearance was still satisfactory with no sign of detonation damage on the treated pistons.

I claim:

1. A method of providing a detonation-resistant coating on a piston of aluminium or aluminium alloy having , a crown, and a ring band extending around the crown and meeting the crown at an edge therebetween, the method comprising:

cutting away the surface of the ring band at said edge to define a recess which has a major portion of constant depth extending around said ring band from said edge, plating said recess with a detonation-resistant material selected from nickel or a nickel alloy, and terminating said plating step when the thickness of the detonation-resistant material is less than the depth of the recess, so that the plated detonation-resistant material does not contact an associated cylinder on reciprocation of the piston therein.

2. A method according to claim 1, wherein a lower edge of the recess is provided with an annular relief extending radially inwardly of the recess.

3. A method according to claim 1, wherein an edge between the recess and the crown is radiussed.

4. A method according to claim 1, wherein the depth of the recess is 0.025 mm.

5. A method according to claim 1, wherein the detonation-resistant material is applied to a required thickness by a selective electroplating process in which an anode is arranged with a surface or surfaces thereof parallel to but spaced from the surface or surfaces to be treated with a substantially constant gap therebetween, an electrolyte being arranged in said gap and a plating solution being passed through said gap, the piston acting as the cathode.

6. A method according to claim 5, wherein the electrolyte is held in a porous pad arranged in said gap between the anode and the surface to be plated.

7. A method according to claim 5, wherein the anode is annular in shape, and is arranged coaxially with the piston, the anode including a step of inverted L-shape which overlies the recess and the portion of the crown around said edge.

8. A detonation-resistant piston for an internal combustion engine comprising:
 a piston body of aluminium or aluminium alloy,
 a crown formed by said piston body at an upper end thereof,
 a ring band formed by said piston body and extending around said crown,
 an edge between said crown and said ring band,
 a cut-away portion which has a major portion of constant depth extending around said ring band from said edge,
 a plated layer of a detonation-resistant material selected from the group of nickel or a nickel alloy in said cut-away portion, the thickness of said plated layer of detonation-resistant material being less than the depth of the cut-away portion to prevent contact between said detonation-resistant material and an associated cylinder on reciprocation of the piston therein.

* * * * *